UNITED STATES PATENT OFFICE 2,487,879

POLYMERS OF DIALKENYL ACETALS

William O. Kenyon and Thomas F. Murray, Jr., Rochester, N. Y., assignors to Eastman Kodak Company, Rochester, N. Y., a corporation of New Jersey No Drawing. Application October 10, 1947, Serial No. 779,226

4 Claims. (Cl. 260—86.1)

This invention relates to new and useful co-polymers. More specifically this invention relates to a process for copolymerizing a mixture consisting of a dialkenyl acetal and another polymerizable, unsaturated organic compound.

It is known that allyl esters of dibasic acids are useful as cross-linking agents in the preparation of synthetic resins. For example, Garvey and Alexander in U. S. Patent 2,202,846, dated June 4, 1940, show that copolymers of various monomeric polyallyl compounds, such as diallyl esters of dibasic acids and diallyl ether, and various monomeric vinyl compounds can be prepared. Slagh U. S. Patents 2,220,854 and 2,220,855 dated November 5, 1940 describe di-$\beta$-methallyl maleate and fumarate and state that these esters are useful as modifying agents in the polymerization of vinyl compounds. Rothrock U. S. Patent 2,221,663 dated November 12, 1940 describes copolymers of di-$\beta$-methallyl maleate and vinyl esters, acrylic or $\alpha$-methacrylic esters, 1,3-butadiene, styrene, etc.

We have now found that dialkenyl acetals which are not ester compounds can be copolymerized with unsaturated compounds to give highly useful resinous copolymers. The copolymers prepared according to the process are, in general, insoluble in the common organic solvents, such as acetone, methyl ethyl ketone, etc.

It is therefore an object of our invention to provide new copolymers of a dialkenyl acetal and another unsaturated compound. A further object of our invention is to provide a process for preparing resinous copolymers of a dialkenyl acetal and another unsaturated compound. Other objects will become apparent from a consideration of the following description.

According to the process of our invention we copolymerize a mixture consisting of a dialkenyl acetal and another unsaturated compound by heating the mixture with or without a polymerization catalyst.

The dialkenyl acetals which we can advantageously use in our invention can be represented by the formula:

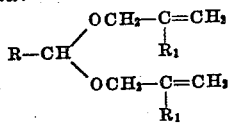

wherein R represents a member selected from the group consisting of a hydrogen atom, an alkyl group, such as methyl, ethyl, n-propyl, isopropyl (i. e. an alkyl group having the formula $C_nH_{2n+1}$ wherein $n$ is a positive integer from 1 to 3), and an aryl group, such as phenyl, o-, m-, and p-tolyl (i. e. a mononuclear aryl group of the benzene series having 6 to 7 carbon atoms), and $R_1$ represents a member selected from the group consisting of a hydrogen atom, a chlorine atom (Cl), and an alkyl group, such as methyl, ethyl (i. e. an alkyl group having 1 to 2 carbon atoms). Typical are: di-$\beta$-methallyl acetal, di-$\beta$-methallyl benzal, di-$\beta$-methallyl formal, diallyl formal, diallyl acetal, diallyl benzal, di-$\beta$-chloroallyl formal, di-$\beta$-chloroallyl acetal, di-$\beta$-chloroallyl benzal, etc. In addition other di-alkenyl acetals, such as divinyl formal, divinyl acetal, divinyl benzal can be used to advantage.

The unsaturated compounds which we can use in our invention advantageously contain a

group or a multiple of such groups. We can use, for example, maleic anhydride, or a compound having the formula:

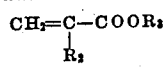

wherein $R_2$ represents a member selected from the group consisting of a hydrogen atom and a methyl group, and $R_3$ represents a member selected from the group consisting of a hydrogen atom, an alkyl group, such as methyl, ethyl, n-propyl, isopropyl, n-butyl, isobutyl (i. e. an alkyl group having the formula $C_nH_{2n+1}$ where $n$ is a positive integer from 1 to 4), and an aralkyl group, such as benzyl, $\beta$-phenylethyl (i. e. a mononuclear aralkyl group containing 7–8 carbon atoms). Typical are: methyl acrylate, methyl $\alpha$-methacrylate, ethyl acrylate, ethyl $\alpha$-methacrylate, n-propyl acrylate, n-propyl $\alpha$-methacrylate, isopropyl acrylate, isopropyl $\alpha$-methacrylate, n-butyl acrylate, n-butyl $\alpha$-methacrylate, isobutyl acrylate, isobutyl $\alpha$-methacrylate, benzyl acrylate, benzyl $\alpha$-methacrylate, acrylic acid, $\alpha$-methacrylic acid, etc. All of the above unsaturated compounds can be copolymerized with the dialkenyl acetals of our invention. The formals (i. e. compounds where R in the above formula stands for a hydrogen atom) can in addition be copolymerized with the alkyl alkenyl ketones represented by the formula:

wherein $R_4$ represents an alkyl group, such as methyl, ethyl, n-propyl, isopropyl, n-butyl, isobutyl (i. e. an alkyl group having the formula $C_nH_{2n+1}$ where $n$ is a positive integer from 1 to 4), and $R_5$ represents an alkenyl group, such as vinyl, allyl, β-methallyl, isopropenyl, crotyl (i. e. an alkenyl group having the formula $C_nH_{2n-1}$ where $n$ is a positive integer from 2 to 4). Typical are: methyl vinyl ketone, ethyl vinyl ketone, n-propyl vinyl ketone, methyl isopropenyl ketone, ethyl isopropenyl ketone, methyl allyl ketone, etc.

In addition to copolymerizing with all of the above unsaturated compounds, the divinyl acetals of our invention can be copolymerized with other unsaturated compounds such as styrene, and vinyl esters having the formula:

wherein $R_6$ represents a member selected from the group consisting of an alkyl group, such as methyl, ethyl, n-propyl, isopropyl (i. e. an alkyl group having the formula $C_nH_{2n+1}$ where $n$ is a positive integer from 1 to 3), and an aryl group, such as phenyl, o-, m-, and p-tolyl (i. e. a mononuclear aryl group of the benzene series having 6–7 carbon atoms). Typical are: vinyl acetate, vinyl propionate, vinyl butyrate, vinyl isobutyrate, vinyl benzoate, etc. In addition isopropenyl acetate can be used. However attempts to copolymerize such acetals as di-β-methallyl acetal with unsaturated compounds such as styrene, vinyl acetate, and methyl isopropenyl ketone have been unsuccessful.

The copolymerization can be accelerated to a considerable extent by heating or using polymerization catalysts which are known to accelerate the polymerization of vinyl-type compounds. Such catalysts are the organic peroxides (e. g. benzoyl peroxide, acetyl peroxide, acetyl benzoyl peroxide, lauroyl peroxide, oleoyl peroxide, etc.), hydrogen peroxide, perborates (e. g. alkali metal perborates, such as sodium and potassium perborates), and persulfates (e. g. alkali metal persulfates, such as sodium, potassium, and ammonium persulfates).

The temperature at which the copolymerization is effected can vary from ordinary room temperature (approximately 20–25° C.) to the temperature of a steam bath (100° C.). The copolymerization can be carried out "en masse," the reactants being heated in the presence of a small amount of catalyst to produce a solid, hard mass, or by the bead or emulsion method in which water or some other medium in which the monomers are insoluble is employed as a dispersing medium, with or without emulsifying agents. The copolymerization can also be effected in the presence of an inert diluent, such as benzene, toluene, xylene, 1,4-dioxane, etc.

Many of the dialkenyl acetals which we can use, such as diallyl formal, diallyl acetal, etc. are known compounds, and can be prepared by means available to the art. Diallyl acetal for example can be conveniently prepared by passing acetylene into allyl alcohol (Reichert et al., "Jour. Am. Chem. Soc.," vol. 45 (1923) pg. 1554). Trillat et al. in "Bull. Soc. Chim. de France," vol. 11 (1894) 3rd Series, pg. 757 describe the preparation of diallyl formal by heating polyoxymethylene with allyl alcohol in the presence of ferric chloride. Other acetals can be prepared in a similar manner by substituting the appropriate aldehyde for the polyformaldehyde or polyoxymethylene of Trillot et al. The dialkenyl acetals of our invention can also be prepared by alcohol interchange where the acetal of a low boiling alcohol, such as methyl or ethyl alcohol is reacted with an alkenyl alcohol, such as β-methallyl or β-chloroallyl alcohol, the low boiling alcohol being displaced by the higher boiling alkenyl alcohol. Our dialkenyl acetals can also be prepared by heating a dichloralkyl acetal with an organic amine, such as quinoline, hydrogen chloride being split out to produce the desired dialkenyl acetal. The following examples will illustrate the manner in which we prepare some of the acetals of our invention.

*Example I.—Preparation of di-(β-methallyl) acetal*

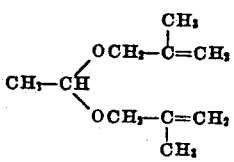

To 320 cc. of β-methallyl alcohol (90% pure) were added 100 g. of calcium chloride (anhydrous) and 2.5 cc. of concentrated hydrochloric acid. After cooling the mixture to between 0° C. and −8° C., 88 g. of acetaldehyde (B. P. 20–22° C.) were added, and the container well-shaken to thoroughly mix the ingredients. The mixture was again cooled to about 0° C. and shaken mechanically for about 24 hours at room temperature, then allowed to stand at room temperature for about 8 days. The calcium chloride was filtered off and the filtrate distilled. The acetal of β-methallyl alcohol was obtained boiling at 179–180° C. at normal pressure. On analysis the following results were obtained.

|   | Calculated | Found |
|---|---|---|
| C | 70.6 | 70.72 |
| H | 10.6 | 10.6 |

Other acetals can be prepared by substituting the appropriate alcohols or aldehydes in molecularly equivalent amounts in the above example. By substituting a molecularly equivalent amount of allyl alcohol and α-butyraldehyde in the above example, diallyl butyral can be prepared.

*Example II.—Preparation of di-(β-chloroallyl)-benzal*

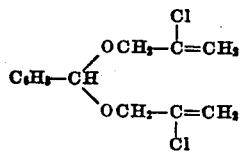

136 parts by weight of benzaldehyde diethyl acetal and 208 parts by weight of β-chloroallyl alcohol were refluxed in a suitable flask surmounted by a total reflux column equipped with a variable take-off. In approximately 2½ hours 84 parts by weight of ethanol had been collected. The reaction mixture was then fractionally distilled under a vacuum, and the fraction boiling at 138–140° C. 12 mm. was collected. The yield was 175 parts by weight (85%) of di-(β-chloroallyl) benzal. The analysis for chlorine content gave 25.71% (calculated Cl was 25.73%).

*Example III.—Preparation of di-(β-chloroallyl) acetal*

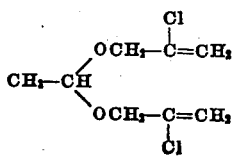

186 parts by weight of β-chloroallyl alcohol and 88 parts by weight of diethyl acetal were refluxed for approximately 2½ hours as in Example II above, and after 83 parts by weight of ethanol had been taken from the column by means of the variable take-off, the residue was fractionated. A yield of 70% (110 parts by weight) of di-(β-chloroallyl) acetal, boiling at 125° C./40 mm. was obtained.

By substituting the appropriate formal acetal, or benzal of ethanol and allyl alcohol, β-chloroallyl alcohol, β-methallyl alcohol, or β-ethallyl alcohol in molecularly equivalent amounts in the above examples other acetals such as di-(β-chloroallyl) formal, di-(β-methallyl) formal, etc. can be prepared.

The divinyl acetals of our invention can be conveniently prepared by the dehydrohalogenation of acetals having the formula:

where R has the above designated definition. Such a process is described by Swann in U. S. Patent 2,299,189, dated Oct. 31, 1939. The following example will illustrate further this method of preparation.

*Example IV.—Preparation of divinyl acetal*

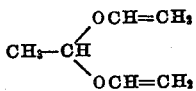

The acetal of ethylene chlorohydrin was prepared according to the method described by Cumming, Hopper, and Wheeler in "Systematic Organic Chemistry" (1931), page 222. A mixture of 266 g. of ethylene chlorohydrin (3 moles + 10% excess), 66 g. (1.5 moles) of acetaldehyde, 50 g. of calcium chloride, and 5 cc. of dilute hydrochloric acid (U. S. P.) was prepared and allowed to stand at room temperature for about 24 hours. The upper layer was then separated off and twice shaken with fresh 50 g. portions of calcium chloride for one day each time, and the product then washed with water and a 10% solution of sodium carbonate. It was then dried over anhydrous potassium carborate and distilled. The acetal of ethylene chlorohydrin was obtained as a distillate, B. P. 110–113° C. at 10 mm. mercury.

200 g. of powdered sodium hydroxide were put into a flask equipped with a dropping funnel and a reflux condenser. The flask was then heated in an oil bath to approximately 200° C. and ethylene chlorohydrin acetal added dropwise to the hot sodium hydroxide until about 370 g. had been added. After cooling slightly the condenser was replaced with a distillation column and the temperature of the bath slowly raised to about 260° C. The vinyl acetal distilled off, and after drying over anhydrous potassium carborate, the distillate was placed in the column once again and distilled. Divinyl acetal was obtained, B. P. 102–104° C. at normal pressure.

The following examples will serve to illustrate the manner in which we copolymerize the dialkenyl acetals of our invention:

*Example V.—Copolymer of di-(β-methallyl) acetal and methyl α-methacrylate*

To one part by weight of di-(β-methallyl) acetal was added 9 parts by weight of methyl α-methacrylate and 0.1 part by weight of benzoyl peroxide (catalyst). The mixture was heated for 24 hours at 50–60° C. at the end of which time a hard product was obtained. This product swelled enormously when put into acetone but did not dissolve. When methyl α-methacrylate was homopolymerized in the manner described above, the polymer obtained dissolved slowly in acetone, but without marked swelling. When copolymerizing a mixture of di-(β-methallyl) acetal and methyl α-methacrylate, as small an amount as 10% by weight of di-(β-methallyl) acetal in the monomeric mixture is sufficient to prevent the formed polymer from dissolving in acetone. Where an acetone soluble polymer is desired, less than 10% by weight of the acetal can be used.

*Example VI.—Copolymer of di-(β-methallyl) acetal and n-butyl α-methacrylate*

A mixture of 5 parts by weight of di-(β-methallyl) acetal, 95 parts by weight of n-butyl α-methacrylate, and 1 part by weight of benzoyl peroxide was prepared. The mixture was then heated at 50–60° C. for 24 hours, at the end of which time a hard polymer was obtained, which was only slightly soluble in acetone but swelled to many times its original size.

*Example VII.—Copolymer of di-(β-methallyl) acetal and n-butyl α-methacrylate*

In a manner similar to Example VI above, 10 parts by weight of di-(β-methallyl) acetal and 90 parts by weight of n-butyl α-methacrylate were copolymerized. A hard product was obtained which swelled to about four times its original volume when put into acetone, but was completely insoluble.

By substituting a molecular equivalent amount of di-(β-methallyl) benzal in the above example, an acetone insoluble product can be produced.

*Example VIII.—Copolymers of di-(β-methallyl) acetal and methyl α-methacrylate*

In the amounts given in the table below, di-(β-methallyl) acetal and methyl α-methacrylate were copolymerized by heating at 50–60° C. in the presence of 0.1% by weight of benzoyl peroxide (based on total weight of unsaturates) and 1,4 dioxane. The resulting products were slightly milky in appearance and were elastic, although they could be torn apart into particles resembling stiff jelly.

| Mols. di-(β-methallyl) acetal | Mols. methyl α-methacrylate | wt. ratio di-(β-methallyl)acetal methyl α-methacrylate | Percent di-(β-methallyl)-acetal in mixture |
|---|---|---|---|
| 1 | 2 | 1:1.2  | 46.0 |
| 1 | 3 | 1:1.76 | 36.0 |
| 1 | 4 | 1:2.35 | 29.8 |
| 1 | 5 | 1:2.94 | 25.4 |
| 1 | 6 | 1:3.53 | 22.1 |
| 1 | 7 | 1:4.13 | 19.5 |
| 1 | 8 | 1:4.7  | 17.5 |

*Example IX.—Copolymer of di-(β-methallyl) acetal and methyl α-methacrylate plasticized with di-n-butyl phthalate*

To 4 molar equivalents of methyl α-methacrylate and 1 molar equivalent of di-(β-methallyl) acetal was added an equal weight (3.35 parts by weight) of di-n-butyl phthalate and 0.1%, based on the total weight of the unsaturates, of benzoyl peroxide. The mixture was then polymerized by heating at 50–60° C., a clear, colorless material, which was similar in physical properties to the products obtained in Example VIII above, being formed. This product did not dissolve in acetone, but did swell considerably.

*Example X.—Copolymer of di-(β-methallyl) acetal and maleic anhydride*

Two molecular equivalents of maleic anhydride were melted in a flask immersed in a water bath whose temperature was 50° C. One molar equivalent of di-(β-methallyl) acetal was then added to the maleic anhydride, and the mixture, containing no catalyst was allowed to remain on the water bath at 50° C. The mixture slowly polymerized to give a bulky, slightly yellowish mass of marble-size lumps. The product swelled but did not dissolve in dilute sodium hydroxide at room temperature.

By substituting a molecularly equivalent amount of di-(β-chloroallyl) formal, a resinous copolymer can be prepared.

*Example XI.—Copolymer of di-(β-methallyl) acetal and maleic anhydride*

Equal molar quantities of di-(β-methallyl) acetal and maleic anhydride were mixed with 1% (based on the combined weight of monomers) of benzoyl peroxide. When the mixture was heated on a steam bath, it reacted somewhat violently giving a product which was insoluble in acetone, acetone-water mixtures, or dilute sodium hydroxide at room temperature (23° C.).

In a similar manner diallyl benzal can be copolymerized with maleic anhydride to produce a resinous polymer.

*Example XII.—Copolymer of di-(β-methallyl) acetal and acrylic acid*

As in Example XI above, equal molar quantities of di-(β-methallyl) acetal and acrylic acid were mixed with 1% (based on the combined weight of the monomer) of acrylic acid. When the mixture was warmed on a steam bath a violent reaction took place. The resulting product was insoluble in acetone, acetone-water mixtures, or dilute sodium hydroxide at room temperature (23° C.). In the above example, the percentage of di-(β-methallyl) acetal in the monomeric mixture prior to polymerization was 70%.

By substituting a molecular equivalent amount of α-methacrylic acid in the above example, a copolymer having physical properties similar to those of the product of Example XII can be obtained.

*Example XIII.—Copolymer of di-(β-methallyl) acetal and acrylic acid*

Two molecular equivalents of acrylic acid, one molecular equivalent of di-(β-methallyl) acetal and 0.1% of their combined weight of benzoyl peroxide were intimately mixed. The mixture was warmed in a water bath at 50–90° C. over a period of one hour. When the temperature reached 90° C., the reaction took place suddenly with mild violence. The resulting product swelled but did not dissolve in 10% sodium hydroxide solution at room temperature.

When di-(β-chloroallyl) propional is copolymerized with α-methacrylic acid by substituting molecularly equivalent amounts in the above example, a valuable copolymer can be prepared.

*Example XIV.—Copolymer of di-(β-chloroallyl) acetal and methyl α-methacrylate*

18 g. of methyl α-methacrylate, 2 g. of di-(β-chloroallyl) acetal and 0.02 g. (0.1% based on the weight of the monomers) of benzoyl peroxide were placed in a closed bottle under an atmosphere of carbon dioxide, and the bottle heated to 50–60° C. After two days a hard, colorless polymer had formed. It partially dissolved in acetone, but after remaining in this solvent for about 2 weeks, most of it remained undissolved, but had swollen considerably.

When a molecularly equivalent amount of di-(β-chloroallyl) n-butyral is substituted in the above example, an insoluble (or slightly soluble) copolymer can be prepared.

*Example XV.—Copolymer of methyl α-methacrylate and di-(β-chloroallyl) acetal*

27 g. of methyl α-methacrylate, 2 g. of di-(β-chloroallyl) acetal, and 0.029 g. (0.1% by weight of combined weight of monomers) of benzoyl peroxide were placed in a closed bottle under an atmosphere of carbon dioxide. After heating the bottle at 50–60° in a water bath for 2 days, a hard polymer had formed. It swelled considerably in acetone, but showed little or no solubility in that solvent.

*Example XVI.—Copolymer of di-(β-chloroallyl) acetal and n-butyl α-methacrylate*

18 g. of n-butyl α-methacrylate, 2 g. of di-(β chloroallyl) acetal, and 0.02 g. of benzoyl peroxide were placed in a closed bottle under an atmosphere of carbon dioxide. After heating the bottle at 50–60° C. on a water bath for 2 days, a rather rubbery polymer was obtained. This product swelled considerably but did not dissolve in acetone.

By substituting a molecularly equivalent amount of di-(β-methallyl) isobutyral in the above example, a copolymer having properties similar to those of the product of Example XVI can be obtained.

*Example XVII.—Copolymer of di-(β-chloroallyl) benzal and methyl α-methacrylate*

18 g. of methyl α-methacrylate, 2 g. of di-(β-chloroallyl) benzal, and 0.02 g. of benzoyl peroxide were placed in a closed bottle under an atmosphere of carbon dioxide. The mixture was then placed in a water bath and heated at 50–60° C. until a hard polymer was produced. This product was found to be entirely soluble in acetone.

*Example XVIII.—Copolymer of methyl acrylate and di-(β-chloroallyl) benzal*

18 g. of methyl acrylate, 2 g. of di-(β-chloroallyl) benzal, and 0.02 g. of benzoyl peroxide were placed in a closed bottle under an atmosphere of carbon dioxide as described in the above examples. The bottle was placed in a water bath and heated at 50–60° C. The resulting polymer was soft and rubbery. It adhered to glass very tenaciously even when chilled to low temperatures. This product was found to swell considerably but to be completely insoluble in acetone.

By substituting ethyl acrylate, n-propyl acrylate, isopropyl acrylate, n-butyl acrylate, or isobutyl acrylate in the above example in molecularly equivalent amounts, other copolymers of our dialkenyl acetals can be prepared.

*Example XIX.—Copolymer of methyl α-methacrylate and diallyl formal*

18 g. of methyl α-methacrylate, 2 g. of diallyl formal, and 0.02 g. of benzoyl peroxide were placed in a closed bottle under an atmosphere of carbon dioxide. The bottle was placed in a water bath and heated at 50–60° C. A hard polymer was thus obtained which swelled considerably but did not dissolve in acetone.

Diallyl acetal or diallyl benzal can be substituted in molecularly equivalent amounts in the above example to give other valuable copolymers.

*Example XX.—Copolymer of diallyl formal and methyl isopropenyl ketone*

18 g. of methyl isopropenyl ketone, 2 g. of diallyl formal, and 0.02 g. of benzoyl peroxide were placed in a closed bottle under an atmosphere of carbon dioxide as above. The bottle was placed in a water bath and heated at 50–60° C. for 5 days. A clear, light-yellow rubbery polymer was formed which was found to be soluble in acetone.

Polymers having similar resinous properties can be prepared by substituting methyl vinyl ketone, ethyl vinyl ketone, or di-(β-methallyl) formal in the above example.

*Example XXI.—Copolymer of methyl α-methacrylate and divinyl acetal*

18 g. of methyl α-methacrylate, 2 g. of divinyl acetal, and 0.02 g. of benzoyl peroxide were placed in a closed bottle under an atmosphere of carbon dioxide. The bottle was then placed in a water bath and heated at 50–60° C. for 2 days. A hard, somewhat cloudy polymer was obtained. This polymeric product itself did not dissolve in acetone, but the acetone after separation from the undissolved polymer was slightly cloudy in appearance, indicating that a small portion of the reaction product had dissolved.

*Example XXII.—Copolymer of methyl acrylate and divinyl acetal*

18 g. of methyl acrylate, 2 g. of divinyl acetal, and 0.02 g. of benzoyl peroxide were placed in a closed bottle under an atmosphere of carbon dioxide. The mixture polymerized rather violently while heating at 50–60° C. on a water bath for 3 hours. The resulting product swelled considerably but did not dissolve in acetone. Substitution of a molecularly equivalent amount of divinyl benzal in the above example gives polymers having similar resinous properties to those of the product of the above example.

*Example XXIII.—Copolymer of styrene and divinyl acetal*

19 g. of styrene and 1 g. of divinyl acetal were placed in a closed bottle under an atmosphere of carbon dioxide. The bottle was then placed in a water bath and heated at 50–60° C. for 4 days. The resulting hard product was found to be completely soluble in benzene.

*Example XXIV.—Copolymer of vinyl acetate and divinyl acetal*

19 g. of vinyl acetate and 1 g. of divinyl acetal were placed in a closed bottle under an atmosphere of carbon dioxide. The bottle was then placed in a water bath and heated at 50–60° C. for 16 hours. A soft, springy, but not sticky, product was obtained. This product was put into an oven and heated at 110° C. for approximately one hour. When the polymer was again brought to room temperature, it was still soft and springy as before. It swelled appreciably but did not dissolve when placed in acetone.

By substituting a molecular equivalent amount of divinyl formal, vinyl propionate, vinyl butyrate, or vinyl isobutyrate in the above example, other copolymers can be prepared.

*Example XXV.—Copolymer of ethyl α-methacrylate and di-(β-methallyl) acetal*

17 g. of ethyl α-methacrylate, 3 g. of di-(β-methallyl) acetal, and 0.02 g. of benzoyl peroxide were placed in a closed bottle under an atmosphere of carbon dioxide. The bottle was then placed in a water bath and heated at 50–60° C. for 24 hours. The resulting product was elastic or springy, and although it swelled considerably in acetone, it did not dissolve.

By substituting molecularly equivalent amounts of di-(β-methallyl) propional, di-(β-chloroallyl) acetal, di-(β-chloroallyl) benzal, etc. in the above example, other copolymers can be prepared.

*Example XXVI.—Copolymer of methyl α-methacrylate and di-(β-ethallyl) acetal*

17 g. of methyl α-methacrylate, 3 g. of di-(β-ethallyl) acetal, and 0.02 g. of benzoyl peroxide were placed in a closed bottle under an atmosphere of carbon dioxide. The bottle was placed in a water bath and heated at 50–60° C. for 24 hours. The resulting product was springy or elastic, and even after heating at 50–60° C. for an additional 48 hours, this property was quite pronounced. This product was found to be soluble in acetone.

In another run similar to that above, 14 g. of ethyl α-methacrylate were copolymerized with 6 g. of di-(β-ethallyl) acetal. The resulting polymer was very viscous, and even upon cooling to 0° C. remained soft. It was likewise found to be soluble in acetone.

*Example XXVII.—Copolymer of methyl acrylate and di-(β-ethallyl) acetal*

17 g. of methyl acrylate, 3 g. of di-(β-ethallyl) acetal and 0.02 g. of benzoyl peroxide were placed in a closed bottle under an atmosphere of carbon dioxide. The bottle was placed in a water bath and heated at 50–60° C. for 24 hours. The resulting product was springy and even after heating for a total of 72 hours at 50–60° C., this property was pronounced. It swelled somewhat in acetone, but did not dissolve.

By substituting molecularly equivalent amounts of n-propyl acrylate, isopropyl acrylate, or di-(β-ethallyl) n-butyral in the above example other copolymers can be prepared.

*Example XXVIII.—Copolymer of methyl α-methacrylate and di-(β-ethallyl) acetal*

17 g. of methyl α-methacrylate, 3 g. di-(β-ethallyl) acetal and 0.02 g. of benzoyl peroxide were placed in a glass bottle under an atmosphere of carbon dioxide. The bottle was placed in a water bath and heated at 50–60° for 24 hours. The resulting polymer was found to be soluble in acetone.

In a similar manner 14 g. of methyl α-methacrylate were copolymerized with 6 g. of di-(β-ethallyl) acetal in the presence of 0.02 g. of benzoyl peroxide. A hard, opaque polymer was obtained which swelled enormously, but did not dissolve, in acetone. The opaque appearance also disappeared and the polymer became clear.

*Example XXIX.—Copolymer of n-butyl α-methacrylate and di-(β-ethallyl) acetal*

17 g. of n-butyl α-methacrylate, 3 g. of di-(β-ethallyl) acetal, and 0.02 g. of benzoyl peroxide were placed in a closed bottle under an atmosphere of carbon dioxide. The bottle was then placed in a water bath and heated at 50–60° C.

for 24 hours. The resulting polymer was soft, and when heated at 50–60° C. for an additional 48 hours, the polymer remained in this condition. It was found to be soluble in acetone.

In a similar manner, 14 g. of n-butyl α-methacrylate were copolymerized with 6 g. of di-(β-ethallyl) acetal in the presence of 0.02 g. of benzoyl peroxide. The resulting polymer was very soft and sticky even at 0° C. It was soluble in acetone.

Other copolymers can be prepared by substituting dialkenyl acetals or unsaturated compounds containing a

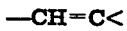

group in the above examples. The type of dialkenyl acetal or unsaturated compound is determined to a considerable extent by the properties desired in the copolymer. By varying the types of reactants; as well as the quantities of materials, polymers varying from soft, acetone-soluble products to hard, acetone insoluble products can be prepared.

It is apparent from the above examples that the ratio of dialkenyl acetal to unsaturated compound can be varied over a considerable range depending on the degree of cross-linking desired. Advantageously we can use a monomeric mixture consisting of from 5–70% by weight of dialkenyl acetal, the remainder (30–95% by weight) of the reaction mixture consisting of another unsaturated compound. Smaller or larger percentages of the dialkenyl acetal can be used, however there is ordinarily no advantage in doing so.

Our new copolymers can be modified with plasticizers such as the following:

Dibutyl phthalate
Dibenzyl phthalate
Dibenzyl succinate
Butoxyethyl tetrahydrofuroate
Cyclohexyl acetate
Diethylene glycol monobutyl ether
Diethylene glycol dibutyrate
Diethoxyethyl adipate
Diethoxyethyl sebacate
Ethylene glycol monobenzyl ether
Dimethoxyethyl phthalate
Ditetrahydrofurfuryl adipate
Triacetin
Tripropionin
Triamyl phosphate
Tributyl phosphate
Triethyleneglycol diacetate
Triphenyl phosphate
Camphor The insoluble polymers of our invention can be cast into sheets, tubes, stoppers, or similar articles, while the soluble polymerized compositions can be used as a rubber substitute in forming gloves, aprons, protective coatings to metals or water-proof impregnating agents. Due to the results of cross-linking large quantities of plasticizers can be introduced without causing stickiness, but elastic or rubbery compositions result.

We claim:

1. A resinous copolymer of di-(β-chloroallyl)-benzal having the formula:

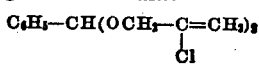

and methyl α-methacrylate, said copolymer having been prepared from a mixture consisting of 5 to 70 per cent by weight of the acetal and 30–95 per cent by weight of the methyl α-methacrylate.

2. A resinous copolymer of a dialkenyl acetal having the formula:

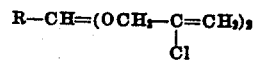

wherein R represents a mononuclear aryl group of the benzene series having from 6 to 7 carbon atoms, and a compound having the formula:

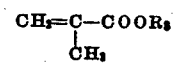

wherein $R_3$ represents an alkyl group of the formula $C_nH_{2n+1}$ wherein $n$ is a positive integer from 1 to 4, said copolymer having been prepared from a mixture consisting of from 5 to 70 per cent by weight of the acetal and from 30 to 95% by weight of the other unsaturated compound.

3. A process for preparing a resinous copolymer which comprises heating in the presence of a peroxide polymerization catalyst a mixture consisting of from 5 to 70 per cent by weight of a dialkenyl acetal having the formula:

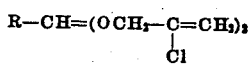

wherein R represents a mononuclear aryl group of the benzene series having from 6 to 7 carbon atoms, and from 30 to 95 per cent by weight of an acrylic ester having the formula:

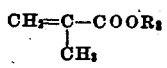

wherein $R_3$ represents an alkyl group of the formula $C_nH_{2n+1}$ wherein $n$ is a positive integer from 1 to 4.

4. A process for preparing a resinous copolymer which comprises heating in the presence of a peroxide polymerization catalyst a mixture consisting of from 5 to 70 per cent by weight of di-(β-chloroallyl) benzal having the formula:

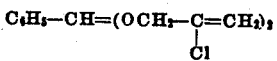

and from 30 to 95 per cent by weight of methyl α-methacrylate.

WILLIAM O. KENYON.
THOMAS F. MURRAY, Jr.

REFERENCES CITED

The following references are of record in the file of this patent:

UNITED STATES PATENTS

| Number | Name | Date |
|---|---|---|
| 2,124,630 | Quattelbaum | July 26, 1938 |
| 2,290,462 | Allen et al. | July 21, 1942 |
| 2,374,078 | Coffman | Apr. 17, 1945 |
| 2,432,296 | Dorough | Dec. 9, 1947 |
| 2,455,722 | Adelson et al. | Dec. 7, 1948 |